United States Patent Office 3,473,639
Patented Oct. 21, 1969

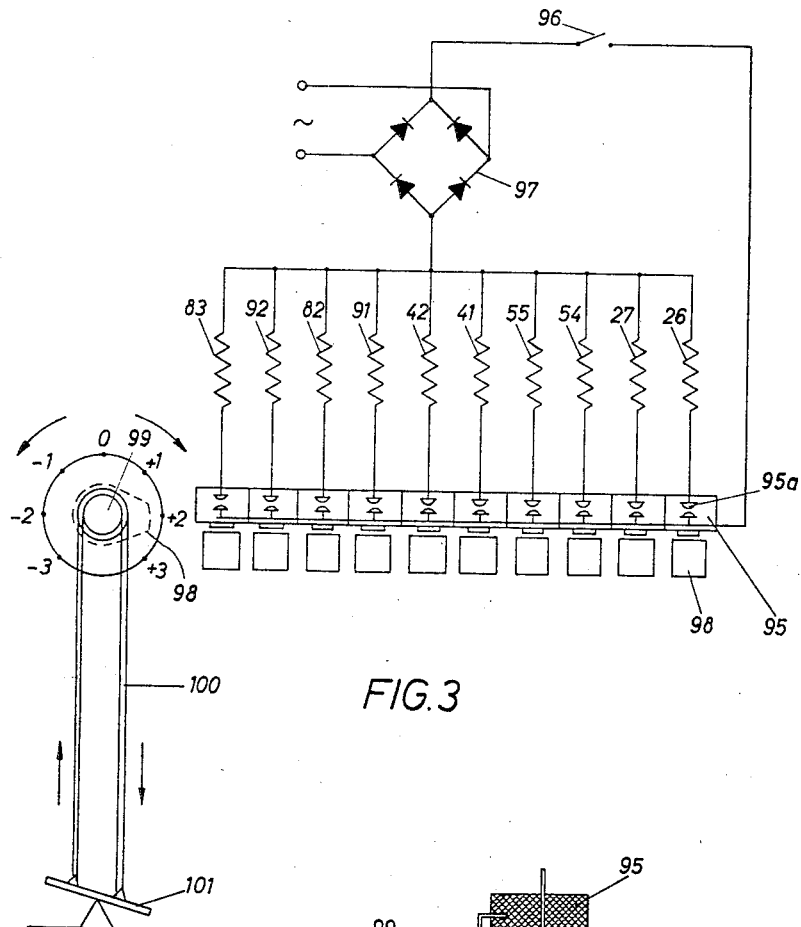
FIG.3
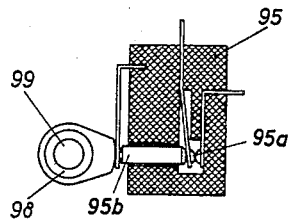
FIG.4a
FIG.4

3,473,639
TRANSMISSION WITH ELECTROMAGNETIC
BRAKE AND CLUTCHES
Ernst Becker and Rudolf Kling, Darmstadt, Germany, assignors to Quick-Rotan Becker & Co., Darmstadt, Germany
Filed May 3, 1968, Ser. No. 726,412
Claims priority, application Germany, May 6, 1967, Q 945
Int. Cl. F16d 67/06, 23/10; F16h 9/00
U.S. Cl. 192—4                                              20 Claims

ABSTRACT OF THE DISCLOSURE

A clutch transmission has a series of interconnected clutch units, each of which can be electromagnetically shifted between two positions so that by selective energization of electromagnetic windings, the speed and direction of rotation of the output shaft of the last clutch unit can be adjusted.

BACKGROUND OF THE INVENTION

The present invention relates to an electromagnetic clutch transmission, and more particularly to a multistage transmission by which different and reversed speeds of an output shaft can be obtained by shifting of electromagnetic clutches.

Electromagnetic clutch transmissions of this type are particularly used when apparatus is to be driven, reversed, and precisely stopped by a motor which drives the apparatus through the transmission. The transmission makes it possible to control operations which have to be frequently interrupted and require stopping of a drive shaft. A motor and transmission arrangement of this type is advantageously used for driving machine tools, winding machines, capacitor winding machines, and sewing machines.

In accordance with the prior art, a coupling means is shifted under control of a foot pedal into coupling engagement with a flywheel on the motor shaft or with a stationary brake member. The known transmissions may have two stages, and the second stage and a different rotary speed of the output shaft is obtained by a rotatable clutch member which takes the place of the brake member, and is driven by an auxiliary drive, as, for example, disclosed in the U.S. Patent 3,253,562. However, the mechanical operation of clutches is very tiring for the operator, and the clutches of this type cannot be rapidly shifted due to the play in the mechanical linkage.

Electromagnetically operated clutches are also known which are shifted by an electromagnetic means, and returned to an initial position by a spring. The disadvantage of such an arrangement is that the electromagnetic means has to overcome the force of the spring for shifting the clutch. A clutch arrangement of this type is, for example, disclosed in the U.S. Patent 3,227,253.

SUMMARY OF THE INVENTION

It is one object of the invention to provide an electromagnetic multistage transmission by which a motor is connected to an output shaft for driving or rapidly stopping the same.

Another object of the invention is to provide a multistage electromagnetic clutch transmission composed of a series of like clutch units.

Another object of the invention is to provide a multistage electromagnetic clutch transmission for driving an output shaft at several speeds in forward and rearward directions of rotation, without requiring the shifting of gears.

One embodiment of the invention comprises a series of clutch units or clutch means driven by a motor shaft. Each clutch means includes a front clutch member, a rear clutch member, an output shaft, coupling means mounted on the output shaft and being movable between a front position coupling the front clutch member, and a rear position coupling the rear clutch member with the respective output shaft, and electromagnetic means for operating the coupling means and surrounding the same.

The rear clutch member of the rearmost clutch of the series is secured to the motor shaft and the rear clutch members of the other, forwardly located, clutch means are secured to the output shaft of the clutch means respectively located in the rear thereof.

Means for blocking rotation of the front clutch member of the foremost clutch means are provided. The front clutch members of the other, rearwardly located, clutch means are freely rotatable, and can be driven by auxiliary transmission means connecting the front and rear clutch members of the rearwardly located clutch means.

By selective energization of the electromagnetic operating means, the foremost output shaft can be rapidly stopped, its speed adjusted, and the direction of rotation reversed.

In one embodiment of the invention, three clutch means are provided, and the front and rear clutch members of the two rearwardly located clutch means are connected by auxiliary transmissions, one of which is a reduction transmission, while the other is a reversing transmission.

The auxiliary transmissions preferably include an auxiliary shaft carrying two transmission wheels which are respectively connected for rotation with the rear and front clutch members of the respective auxiliary transmission.

Rotation is blocked by moving the coupling means of the foremost clutch means into engagement with a stationary front clutch member which serves as a brake member. In another embodiment of the invention, the respective front clutch member can be rotated and braked by auxiliary clutch and brake devices which turn the front clutch member of the foremost clutch in opposite directions, or stop the same so that the output shaft can be blocked.

The arrangement of the invention permits it to place all shafts along a common axis, and to construct the clutch units of corresponding parts so that comparatively few parts have to be stored, and assembly and service is facilitated.

In the embodiment of the invention in which the front clutch member of the foremost and last clutch unit is driven or braked by auxiliary clutch and brake devices driven from the motor shaft at a reduced speed, the masses which have to be braked are a minimum.

In the preferred construction, the driving clutch member of the auxiliary clutch and brake devices is continually driven from the motor shaft at a higher speed than the speed of the same, while the driven clutch member of the auxiliary device is connected with the clutch member of the foremost clutch unit, which serves as a brake member, by a reduction transmission whose reduction ratio is greater than the ratio of the transmission between the motor shaft and the driving clutch member of the auxiliary device. Due to the high reduction ratio between the auxiliary clutch and brake device and the brake member of the last clutch unit, a short continued rotation of the auxiliary device is transmitted to the output shaft only at a reduced ratio and permits only a negligible turning movement of the output shaft during the braking operation.

In the preferred embodiment of the invention, the electromagnetic means include an annular magnetizable carrier supporting two adjacent annular windings, and the coupling means consists of two coupling members respectively operated by the two windings to move into engagement with the front and rear clutch members, respectively. The carrier and the windings are located between the front and rear clutch members and surround the coupling member with a small air gap so that favorable flux conditions are obtained, and the axial length of each clutch unit is a minimum. The small axial extension of each clutch unit permits the arrangement of a series of clutch units within a small axial space. The electromagnetic means shift the coupling members in both directions, and therefore it is not necessary to provide springs for returning the coupling members, which reduces the magnetic force required of the electromagnetic operating means. Consequently, the carrier and the windings thereon are comparatively light and small, and it is possible to dissipate the heat developed by the windings and by the coupling friction. The annular construction of the electromagnetic means results in cylindrical air gaps concentric with the axis of the shafts so that the wear of the coupling members and of the clutch members has no influence on the width of the air gap, and the flux does not change even after extended use of the apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a diagrammatic view illustrating an electric circuit for operating the embodiment illustrated in FIG. 2;

FIG. 4 is a sectional view illustrating a switch provided in the circuit of FIG. 3; and FIG. 4a is a schematic side elevation illustrating operator controlled means for closing selected switches and for energizing selected windings.

DESCRIPTION OF THE PREFERRED EMBODIMENTS

Figure 1:
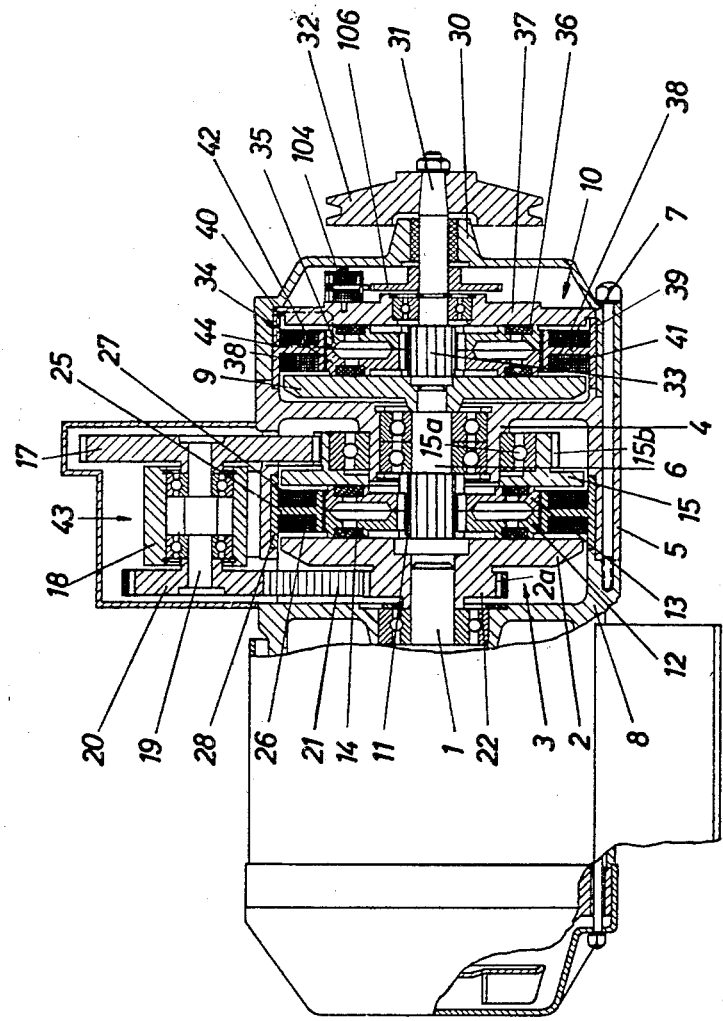
FIG. 1 is an elevation, partially in axial section, illustrating an electromagnetic clutch transmission according to one embodiment by which rapid stopping and reversal of the output shaft can be obtained.

Referring first to FIG. 1, a rearwardly located motor housing 8 is secured by bolts to an intermediate transmission housing 5 and a cap-shaped closure housing part 7 which is located in front. A motor in housing 8 drives a motor shaft 1 from which power is derived for driving a rearwardly located clutch means 3 and a forwardly located clutch means 10 whose output shaft 31 carries an output pulley 32 from which the drive shaft of an apparatus, not shown, is driven.

The rear clutch means 3 includes a rear clutch member 2 secured to motor shaft 1, a front clutch member 15 mounted on bearings 15a for free rotation on a supporting portion 4 of housing part 5, coupling means in the form of two coupling members 12 and 13 and electromagnetic operating means 28 including a carrier 25 and two windings 26 and 27 surrounding coupling members 12 and 13.

Coupling members 12 and 13 have annular linings 14 cooperating with surfaces of the front and rear clutch members 2 and 15 and are mounted on a splined portion 11 of output shaft 6 of clutch means 3 for axial movement independently of each other, while connected for rotation with shaft 6. Windings 26 and 27 can be selectively energized so that rear winding 26 shifts rear coupling member 12 to a rear position frictionally coupled with rear clutch member 2, while front winding 27 shifts front coupling member 13 to a front position coupled with the freely rotatable front clutch member 15.

An auxiliary reversing transmission 43 connects clutch member 2 and motor shaft 1 with clutch member 15. A gear portion 15b of clutch member 14 meshes with a gear 17 secured to a shaft 19 which is mounted in bearings supported in a housing part 18, and carries a gear 20 driving a gear belt 21 which passes over a gear portion 2a of clutch member 2. Auxiliary transmission 43 will rotate the front clutch member 15 in a direction of rotation opposite to the direction of rotation of rear clutch member 2 and motor shaft 1.

The front clutch means 10 has a rear clutch member 9 secured to output shaft 6 of clutch means 3. The output shaft 31 has a splined portion 33 on which coupling means in the form of two coupling members 34, 35 are mounted for independent axial movement while being connected for rotation with output shaft 31. Coupling members 34, 35 have linings 36 and are surrounded by electromagnetic operating means 44 which include two annular windings 41 and 42. By selective energization of windings 41 and 42, coupling member 34 can be moved toward the rear to a position frictionally coupled with the rear clutch member 9, while coupling member 35 can be moved to the front into frictional engagement with front clutch member 37 which is fixed to closure housing part 7 and serves in the embodiment of FIG. 1 as a brake member. The stationary brake member 37 supports a bearing in which output shaft 31 is rotatably mounted.

The electromagnetic operating means 44 include an annular carrier 38 consisting of a magnetizable material and having a I-shaped cross section, the outer peripheral portion of carrier 38 having annular end portions surrounding the clutch members 9 and 37 so that a strong flux flows through carrier 38, the clutch members 9 or 37, and the magnetizable coupling members 34, 35 when one of the windings 41, 42 is energized. The outer peripheral portion of carrier 38 is secured in a groove 40 of housing part 7.

When winding 42 of clutch means 10 is energized, a magnetic flux 44 is generated which flows through the right side of carrier 38, the cylindrical air gap between the inner peripheral portion of carrier 38 and the outer peripheral portion of coupling member 35 into clutch member 37 and back to carrier 38. The magnetic force acting on coupling member 35 presses the same into a front position in which lining 36 abuts the brake clutch member 37 so that coupling member 35 is blocked and stops the main output shaft 31 with output pulley 32.

If instead of winding 42, winding 41 of clutch means 10 is energized, coupling member 34 is presser into a rear position coupled with rear clutch member 9 so that output shaft 31 of clutch means 10 is coupled with output shaft 6 of clutch means 3. If winding 27 of clutch means 3 is also energized, coupling member 13 is moved to a front position coupled with front clutch member 15 which is rotated from motor shaft 1 through the auxiliary transmission 2a, 21, 20, 19, 17, and 15b. Consequently, motor shaft 1 rotates the intermediate output shaft 6 and the main output shaft 31 in a direction of rotation opposite to the direction of rotation of motor shaft 1. If the transmission ratio of the auxiliary transmission 43 is 1:1, the reversed speed of output shaft 31 is equal to the speed of motor shaft 1.

If winding 26 instead of winding 27 is energized, rear coupling member 12 is moved to a rear position coupled with rear clutch member 2 so that torque is transmitted to the splined portion 11 of the intermediate output shaft 6 whereby main output shaft 31 is driven in the same direction of rotation and at the same rotary speed by motor shaft 1, while the auxiliary transmission 43 is ineffective.

Figure 2:
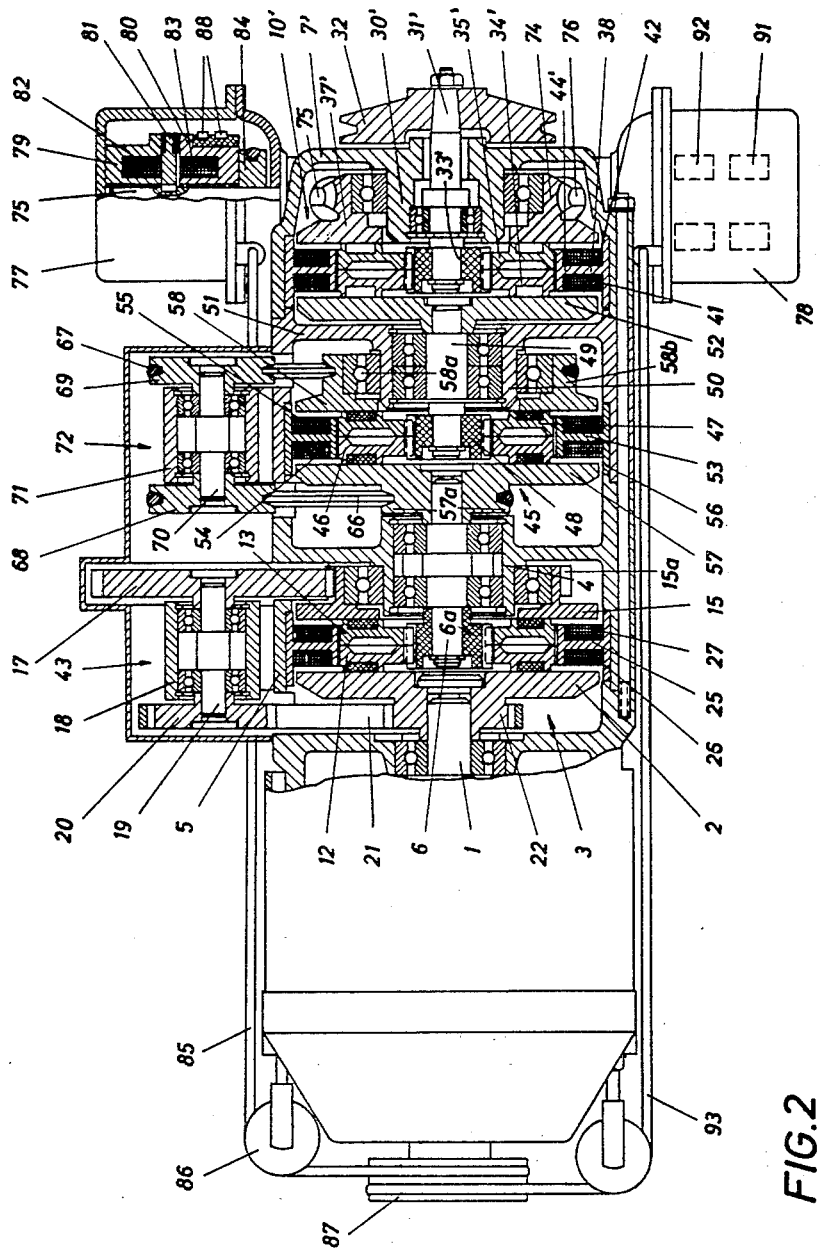
FIG. 2 is an elevation, partially in axial section, illustrating another embodiment of the invention by which reversal, rapid stopping, and different rotary speeds of the output shaft can be obtained.

In the embodiment of FIG. 2, three clutch units 3, 45, and 10' are provided. Clutch means 3 is constructed as described with reference to FIG. 1 and includes an auxiliary reversing transmission 43 so that output shaft 6 of clutch means 3 can be rotated in opposite directions, depending on which of the windings 26, 27 is energized. Clutch means 45 is constructed in a similar manner. A rear clutch member 57 is secured to output shaft 6, and a front clutch member 58 is rotatably mounted on bearings 58a on a housing portion 51. Coupling means 45 has an intermediate output shaft 49 carrying a fixed splined sleeve 48 on which a front coupling member 47 and a rear coupling member 47 are mounted for independent axial movement, while rotating with intermediate shaft 49. Shaft 6 also has a splined sleeve 6a on which coupling members 12 and 13 are mounted for independent axial movement while being connected for rotation with shaft 6.

Electromagnetic operating means surround coupling members 46, 47 and include annular windings 54 and 55 which can be selectively energized. Carrier 53 is fixedly secured to housing part 51. The annular outer peripheral portion 56 of carrier 53 has end portions surrounding the circular peripheral faces of clutch members 57 and 58 for obtaining optimal flux conditions.

Rear clutch member 57 of clutch means 45 has a pulley portion 57a connected by a belt 66 with a pulley 68 of an auxiliary transmission 72. Pulley 68 is secured to a shaft 70 mounted in bearings supported by a housing part 71, and carrying another pulley 69 connected by belt 67 to a pulley portion 58b of front clutch member 58.

Output shaft 49 of clutch means 45 carries the rear clutch member 52 of clutch means 10'. Output shaft 31' carries an output pulley 32, and a splined sleeve 33' on which two coupling members 34' and 35' are mounted for axial movement independently of each other while being connected for rotation with output shaft 31'. Electromagnetic operating means 44' surround coupling members 35' and 34' and includes a carrier 38 on which two windings 41 and 42 are mounted. The front clutch member 37' of clutch means 10' has a worm gear portion 74 and is mounted for rotation with the same on a sleeve portion 30' of housing part 7'. As described with reference to clutch means 3 and 45, selective energization of windings 41 and 42 effects coupling of output shaft 31' with clutch member 52 or clutch member 37'.

Clutch member 37' and worm gear 76 can be turned in opposite directions by worm spindles 75 and 76 which are respectively fixedly connected with coupling plates 80 of a pair of auxiliary clutch and brake devices 77 and 78 which are of identical construction so that only clutch and brake device 77 is shown in section.

The auxiliary clutch and brake device 77 has a stationary brake member 79 secured to a housing part, and a clutch member 80 which is rotatably mounted on a shaft portion 75a of worm spindle 75. A brake winding 82 and a coupling winding 83 are respectively mounted in brake member 79 and clutch member 80 and act on a coupling plate 81 so that shaft 75a is either stopped, or connected for rotation with clutch member 80. Clutch member 80 is secured to a pulley 84 mounted for rotation on shaft portion 75a and being connected by a belt 85, which is guided over guide roller 86, to a pulley 87 on motor shaft 1. The clutch and brake device 78 has a corresponding pulley, not shown, for driving another pulley 87a on motor shaft 1 by means of a belt 93. Consequently, pulleys 84 of both devices 77 and 78 are continuously rotated in opposite directions and rotate the correspondng clutch members 80 of devices 77 and 78. Pulleys 84 and 87, 87a have diameters selected so that worm spindles 75 and 76 run at a higher speed than motor shaft 1.

When one or the other of the windings 83, 92 is energized, clutch member 37' is rotated in opposite directions, respectively, since the rotation of pulley 84 and clutch member 80 is transmitted by coupling plate 81 to the respective shafts 75a of worm spindles 75 and 76. When a winding 82, 91 is energized, coupling plate 81 abuts the stationary brake member 79 and stops the respective shaft 75a with worm spindle 75 and clutch member 37' which thus serves as a stationary brake member. As schematically shown, the clutch and brake device 78 has two windings 91 and 92 respectively corresponding to windings 82 and 83.

FIG. 3 shows windings 26, 27 of clutch means 3, windings 54, 55 of clutch means 45, windings 41, 42 of clutch means 10', windings 82 and 83 of clutch and brake device 77 and windings 91 and 92 of clutch and brake device 78. All windings are connected to a rectifier bridge circuit 97 which is connected with a voltage source. Each of the windings is connected to a pair of contacts 95a of a switch means 95, all contacts being connected through a main switch with the rectifier bridge 97. It is advantageous to use a part of the stator winding of the motor as a voltage source.

Each of the contacts 95a is operated by an actuator 95b when engaged by a cam 98 on a turnable shaft 99 which can be turned between seven angular positions by operation of a tiltable foot pedal which is connected by a rope or cable 100 with a pulley portion of shaft 99. Shaft 99 can be turned from the normal zero position in one direction to three positions −1, −2, and −3, and in the opposite direction to three positions +1, +2, and +3. In each of the six operative positions of cam shaft 99, different selected contacts 95a are closed so that certain windings are energized.

It is assumed that auxiliary transmission 43 has the ratio 1:1 so that clutch member 15 rotates at the same speed as motor shaft 1, but in opposite direction. It is further assumed that auxiliary transmission 72 has a reduction ratio of 3:1 so that clutch member 58 rotates at one-third of the speed of clutch member 57. The transmission ratio between pulleys 87, 87a and worm gear 74 is to be 10:1, and motor shaft 1 rotates at 3,000 r.p.m. By simultaneously energizing at least two windings by closing contact means 95a by at least two cams 98 on shaft 99, the rotary speed of the main output shaft 31' can be determined in accordance with the following table:

|  | | Output shaft revolutions/min. | Energized windings | | |
|---|---|---|---|---|---|
| Positions: | | | | | |
| 0 | | 0 | 42 | 82 | 91 |
| +1 | Forward | 300 | 42 | 83 | |
| +2 | Rotation | 1,000 | 26 | 55 | 41 |
| +3 | | 3,000 | 26 | 54 | 41 |
| 0 | | 0 | 42 | 82 | 91 |
| −1 | | 300 | 42 | 92 | |
| −2 | Reversed | 1,000 | 27 | 55 | 41 |
| −3 | Rotation | 3,000 | 27 | 54 | 41 |

In position zero of cam shaft 99, winding 42 of the foremost clutch means 10', and brake windings 82 and 91 of the auxiliary devices 77 and 78 are energized since the respective microswitches 95a are closed by the respective cams 98. Coupling member 35' is coupled with front clutch member 37' and worm gear 74 which is blocked by worm spindles 75 blocked by coupling plates 80 which are stopped by engagement with brake members 79 due to the action of brake windings 82 and 91. Motor shaft 1 idly rotates front clutch member 15 of clutch means 3 through the auxiliary transmission 43. In position +1, winding 42 of coupling means 10' remains energized, but the brake windings of the auxiliary devices 77, 78 are disconnected. Since winding 83 is energized, coupling plate 81 is coupled with clutch member 80 which is driven from the motor shaft by the belt and pulley drive 84 to 87. The rotating worm spindle 75a, 75 rotates worm gear 74 with clutch member 37' which is coupled by the energized winding 42 and coupling members 35' with output shaft 31' so that the same is driven at 300 r.p.m. in a forward direction of rotation.

In the position −1 of the operator controlled means 98 to 101, output shaft 31' rotates in the reversed direction of rotation since worm gear 74 and clutch member 37' are driven from pulley 87a through device 78 by worm spindle 76.

In the position +2 of the operator controlled means 98 to 101, torque is transmitted from rear clutch member 2 of coupling means 3 through coupling member 12 to output shaft 6 which drives clutch member 57 of clutch means 45 so that rotation is transmitted through auxiliary transmission 72 to clutch member 58 which is coupled by coupling member 47 to output shaft 49 of clutch means 45 due to the energization of winding 55. Output shaft 49 drives clutch member 52 which is coupled with coupling member 34 due to energization of winding 41 so that output shaft 31' is rotated at one-third of the speed of motor shaft 1 due to the 3:1 transmission ratio of auxiliary transmission 72.

In position −2 of the operator controlled means, output shaft 6 is driven in a reversed direction of rotation by coupling member 13 which is coupled with clutch member 15 and gear 15a with the reversing transmission 43. The connection between output shaft 6 and output shaft 31' is as described above.

In the position +3 of the operator controlled means, motor shaft 1 directly drives output shaft 6 through coupling member 12, and clutch member 57 is driven by output shaft 6 and connected by coupling member 46 with output shaft 49 which is connected by coupling member 34' with the main output shaft 31.

In the position −3 of the operator controlled means, winding 27 instead of winding 26 is energized so that output shaft 6 is driven from motor shaft 1 through the auxiliary reversing transmission 43, resulting in reverse rotation of the main output shaft 31'. Since the reversing transmission 43 has the ratio of 1:1, the speed of the output shaft 31' is the same as the speed of the motor shaft 1, namely 3,000 r.p.m.

The drive shaft of an apparatus which has to be accurately stopped in a certain angular position, is driven through a pulley and belt transmission of which only pulley 32 on output shaft 31' is shown in FIG. 2. In order to precisely stop the drive shaft, the auxiliary clutch and brake devices can be operated in a manner described with reference to FIGS. 1a, 1b and 1c of U.S. Patent 3,174,450.

Referring again to FIG. 1, a magnetizable gear 106 is mounted on output shaft 31 for rotation therewith, and has a predetermined number of peripheral projections which cooperate with a magnetic head 104 to generate impulses at a frequency corresponding to the rotary speed of shaft 31. The pulses generated by the magnetic head 104 are advantageously supplied to an electronic control circuit which regulates the alternative energization of the coupling winding 41 and the brake winding 42 so that output shaft 31 rotates at a constant speed, irrespective of slight speed variations of motor shaft 1. If the rotary speed of output shaft 31 is smaller than a desired speed, which is set on a control device of the control circuit, output shaft 31 is driven, and if the rotary speed of output shaft 31 exceeds the predetermined desired speed, output shaft 31 is braked since the energized winding 42 presses coupling member 45 against the stationary brake member 37. Due to the extremely low inertia and rapid response of the clutch means 10, a desired speed can be maintained constant at a high accuracy. The clutch means 3 is operated to reverse the direction of rotation, whenever desired.

It will be understood that each of the elements described above, or two or more together, may also find a useful application in other types of transmissions having electromagnetic clutch means differing from the types described above.

While the invention has been illustrated and described as embodied in a multiple clutch transmission, shifted between different speeds by energization of windings controlling clutches, it is not intended to be limited to the details shown, since various modifications and structural changes may be made without departing in any way from the spirit of the present invention.

What is claimed as new and desired to be protected by Letters Patent is set forth in the appended claims.

We claim:

1. Electromagnetic clutch transmission, comprising, in combination, a motor shaft having an axis; a series of clutch means disposed along said axis forwardly of said motor shaft, each clutch means including a front clutch member, a rear clutch member, an output shaft coaxial with said motor shaft, coupling means mounted on said output shaft for rotation therewith and movable in axial direction between a front position coupled with said front clutch member and a rear position coupled with said rear clutch member, and electromagnetic operating means for moving said coupling means between said front and rear positions; the rear clutch member of the rearmost clutch means being secured to said motor shaft, and the rear clutch members of the other, forwardly located, clutch means being secured to the output shafts of the clutch means respectively located in the rear thereof; means for blocking rotation of the front clutch member of the foremost clutch means; mounting means for mounting the front clutch members of the other, rearwardly located, clutch means for free rotation; and driven auxiliary transmission means connected with said rear clutch members of said other, rearwardly located, clutch means whereby the foremost output shaft can be stopped, and its speed varied by selective energization of said electromagnetic operating means.

2. Clutch transmission as claimed in claim 1 wherein said auxiliary transmission means include a plurality of transmissions respectively connecting the front and rear clutch members of said rearwardly located clutch means.

3. Clutch transmission as claimed in claim 2 wherein each of said auxiliary transmissions includes an auxiliary shaft having an axis parallel to said axis, transmission members secured to the end of said shaft, and means connecting said transmission members, respectively with said front and rear clutch members.

4. Clutch transmission as claimed in claim 1 wherein said means for blocking rotation include a stationary housing part, and means for securing said front clutch member of the foremost clutch means to said housing part.

5. Clutch transmission as claimed in claim 1 wherein said front clutch member of said foremost clutch means is mounted for free rotation; and including at least one reduction transmission, and an auxiliary clutch device driven from said motor shaft and driving said front clutch member of said foremost clutch means at a rotary speed which is smaller than the rotary speed of said motor shaft.

6. Clutch transmission as claimed in claim 5 wherein said reduction transmission rotates said front clutch member of the foremost clutch means in one direction of rotation, and including another reduction transmission, and another auxiliary clutch device connecting said motor shaft with said front clutch member of said foremost clutch means for driving the same in a direction of rotation opposite to the direction of rotation of said motor shaft.

7. Clutch transmission as claimed in claim 5 wherein said auxiliary clutch device includes an auxiliary brake means, and auxiliary electromagnetic means for effecting driving and braking, respectively, of said front clutch member of said foremost clutch means.

8. Clutch transmission as claimed in claim 5 wherein said auxiliary clutch device includes a driving clutch member, and a driven clutch member, wherein said reduction transmission connects said driven clutch member with said front clutch member of said foremost clutch means, said auxiliary clutch device further including a transmission connecting said motor shaft with said drive member and having a smaller transmission ratio than the transmission ratio of said reduction transmission.

9. Clutch transmission as claimed in claim 1 wherein said electromagnetic operating means of each of said clutch means includes an annular at least partly magnetizable carrier surrounding said coupling means and being concentric with said axis, and two annular windings concentric with said axis and supported on said carrier, said carrier having a cylindrical inner peripheral portion forming an air gap with a cylindrical outer peripheral portion of said coupling means, said carrier and said windings being located between outer peripheral portions of said front and rear clutch members so that the flux of said winding flows through said carrier, one of said clutch members, and the outer peripheral portion of said coupling means when said windings are selectively energized.

10. Clutch transmission as claimed in claim 9 wherein each coupling means of said clutch means includes two coupling members mounted on the respective output shaft for independent axial movement and connected to the same for rotation therewith, said coupling members being respectively actuated by said windings to move to said front and rear positions, respectively.

11. Clutch transmission as claimed in claim 10 wherein magnetizable portions of said coupling members are respectively in contact with said front and rear clutch members when said coupling members abut each each other in a normal inoperative position out of which said coupling members are moved by said electromagnetic operating means into pressure contact with said clutch members, respectively.

12. Clutch transmission as claimed in claim 9 wherein each of said output shafts includes a splined fixed sleeve supporting said coupling members for independent axial movement.

13. Clutch transmission as claimed in claim 10 wherein said carrier has substantially the same axial width as said coupling members in an adjacent position.

14. Clutch transmission as claimed in claim 13 wherein said carrier has a I-shaped cross section.

15. Clutch arrangement as claimed in claim 13 wherein said carrier has I-shaped cross section, and includes an inner cylidrical peripheral portion, an outer cylindrical peripheral portion, and a web portion located in a plane perpendicular to said axis, said outer peripheral portion being longer in axial direction than said inner peripheral portion and having end portions surrounding said front and rear clutch members forming a small air gap with the same.

16. Clutch transmission as claimed in claim 15 comprising housing means having bearings for supporting said outputshafts, and fixedly supporting said carrier of each of said clutch means.

17. Clutch transmission as claimed in claim 1 wherein each of said electromagnetic operating means includes two windings for respectively moving said coupling means between said front and rear positions; comprising a plurality of switches respectively connected with said windings of said series of clutch means; a cam shaft having a plurality of cams respectively cooperating with said switches for operating the same; and operator control means for turning said cam shaft between a plurality of positions in which different combinations of said switches are closed for connecting different combinations of windings to a source of voltage.

18. Clutch transmission as claimed in claim 1 and including electric control means for selectively energizing said electromagnetic operating means so that said output shaft of said foremost clutch means is alternately driven and braked for maintaining a desired speed.

19. Clutch transmission as claimed in claim 1 wherein said series of clutch means consists of a forward clutch means and a rearward clutch means; wherein said auxiliary transmission means is a reversing transmission connecting said front and rear clutch members of said rear clutch means, comprising a housing; and wherein said blocking means include means for securing said front clutch member of the foremost clutch means to said housing so that the output shaft of said front clutch means can be stopped and reversed.

20. Clutch transmission as claimed in claim 1 wherein said auxiliary transmission means includes a reversing transmission connecting said front and rear clutch members of said rearmost clutch means, and a reduction transmission connecting said front and rear clutch members of a clutch means located between said foremost and said rearmost clutch means; and at least one auxiliary device for braking and driving said front clutch member of said foremost clutch means.

References Cited
UNITED STATES PATENTS

| | | | |
|---|---|---|---|
| 2,868,340 | 1/1959 | Wilson et al. | 192—4 |
| 2,962,139 | 11/1960 | Straub | 192—18.2 |
| 3,174,450 | 3/1965 | Becker et al. | 192—18.2 XR |

BENJAMIN W. WYCHE III, Primary Examiner

U.S. Cl. X.R.

74—218, 377, 664, 722; 192—18, 104